United States Patent [19]

Kamo

[11] 4,070,552

[45] Jan. 24, 1978

[54] MULTI-DIRECTIONAL STEREO MULTIPLE RECORDING APPARATUS WITH CONSTANT ACCELERATION CUTTING

[75] Inventor: Yoshihisa Kamo, Kawasaki, Japan

[73] Assignee: Nippon Columbia Kabushikikaisha, Tokyo, Japan

[21] Appl. No.: 635,624

[22] Filed: Nov. 26, 1975

[30] Foreign Application Priority Data

Nov. 29, 1974 Japan ................................ 49-138013

[51] Int. Cl.[2] ................................................ G11B 3/00

[52] U.S. Cl. ........................ 179/100.4 ST; 179/1 GQ; 179/100.1 TD; 179/100.4 C; 179/100.4 M

[58] Field of Search ............ 179/100.1 TD, 100.4 ST, 179/100.4 C, 1 GQ, 100.4 M, 1 G, 15 BT

[56] References Cited

U.S. PATENT DOCUMENTS

| | | | |
|---|---|---|---|
| 3,686,471 | 8/1972 | Tukahashi | 179/100.4 ST |
| 3,946,165 | 3/1976 | Copper | 11/100.4 ST |

*Primary Examiner*—Raymond F. Cardillo, Jr.

[57] ABSTRACT

A multi-directional stereo multiple recording and reproducing apparatus is disclosed in which a plurality of sound source signals are encoded to a plurality of main- and sub-channel signals, the encoded main-channel signals and a carrier signal of a frequency $f_c$ which is angle-modulated with the sub-channel signals are mixed through a filter circuit, and the modulated signal is recorded on a lacquer master disc by a constant acceleration cutting and then reproduced therefrom.

10 Claims, 10 Drawing Figures

MULTI-DIRECTIONAL STEREO MULTIPLE RECORDING APPARATUS WITH CONSTANT ACCELERATION CUTTING

BACKGROUND OF THE INVENTION

1. Field of the Invention

The present invention relates to multi-directional stereo multiple recording and reproducing apparatus and a reproducing record disc, and particularly to a recording apparatus, adapted to record a modulated subchannel signal on a record disc at a constant acceleration in order to decrease a noise produced by a drop-out which is caused by a harmonic distortion of a main-channel signal during the reproduction of a record disc.

2. Description of the Prior Art

There have hitherto been proposed various types of multi-directional stereo multiple recording apparatus and record discs. A so-called universal matrix system (hereinafter referred to as a UM system) is known as one system of the recording apparatus. The UM system has advantages in that the compatibility between monoral and 2-channel stereo systems is superior, the fidelity of original sound field reproduction and its sound image positioning are good and the freedom of loud-speaker disposition is high.

The basis of the prior art UM system will be described with reference to FIG. 1. In FIG. 1, reference numeral 1 designates a magnetic recording and reproducing apparatus in which a magnetic tape is recorded with a left-front signal $S_{LF}$, a right-front signal $S_{RF}$, a left-back signal $S_{LB}$ and a right-back signal $S_{RB}$ which represent a sound field. These four signals are derived from microphones disposed at positions corresponding to a left-front loud-speaker $L_F$, a right-front loud-speaker $R_F$, a left-back loud-speaker $L_B$ and a right-back loud-speaker $R_B$ which are disposed perpendicularly intersecting each other in a listening space surrounding a listener 20 at, for example, a record disc reproducing apparatus shown in FIG. 2.

These four signals $S_{LF}$, $S_{RF}$, $S_{LB}$ and $S_{RB}$ derived from the magnetic recording and reproducing apparatus 1 are applied to an encoder 2 to derive therefrom main-channel signals $T_L$ and $T_R$ and sub-channel signals $T_T$ and $T_Q$ which are expressed by the following equation (1).

$$\left.\begin{aligned}
T_L &= 0.924\, S_{LF}\angle 22.5^\circ + 0.383\, S_{RF}\angle 67.5^\circ \\
&\quad + 0.383\, S_{RB}\angle -67.5^\circ + 0.924\, S_{LB}\angle -22.5^\circ \\
T_R &= 0.383\, S_{LF}\angle -67.5^\circ + 0.924\, S_{RF}\angle -22.5^\circ \\
&\quad + 0.924\, S_{RB}\angle 22.5^\circ + 0.383\, S_{LB}\angle +67.5^\circ \\
T_T &= 1.414\, S_{LF}\angle 135^\circ + 1.414\, S_{RF}\angle 45^\circ \\
&\quad + 1.414\, S_{RB}\angle -45^\circ + 1.414\, S_{LB}\angle -135^\circ \\
T_Q &= 1.414\, S_{LF}\angle +90^\circ + 1.414\, S_{RF}\angle -90^\circ \\
&\quad + 1.414\, S_{RB}\angle +90^\circ + 1.414\, S_{LB}\angle -90^\circ
\end{aligned}\right\} \quad (1)$$

The main-channel signals $T_L$ and $T_R$ from the encoder 2 are phase-compensated by a filter and phase-compensating circuit 3 and the sub-channel signals $T_T$ and $T_Q$ are filtered thereby. The phase-compensated main-channel signals $T_L$ and $T_R$ are applied to a recording equalizer 4 having RIAA characteristics, while the sub-channel signals $T_T$ and $T_Q$ are fed through pre-emphasis circuits 10 and 11 to angle modulators 6 and 7 to angle-modulate a carrier signal of a frequency $f_c$.

Thus angular-modulated signals are expressed as modulated sub-channel signals $T_T'$ and $T_Q'$. These signals $T_T'$ and $T_Q'$ are applied to a mixer 5 for being added with the main-channel signals $T_L$ and $T_R$ to form two multiplex signals $T_L + T_T'$ and $T_R + T_Q'$. These multiplex signals $T_L + T_T'$ and $T_R + T_Q'$ are supplied through a recording amplifier 8 to a 45° -45° record disc cutter 9, which is used to cut a prior art stereo record, thereby to engrave a recording lacquer disc 12 with the signal $T_L + T_T'$ on one wall of its sound groove and with the signal $T_R + T_Q'$ on the other wall thereof.

Thus, the sound groove of the lacquer disc 12 is recorded on its one groove wall 13L with the main-channel signal $T_L$ and the modulated sub-channel signal $T_T'$ and on its other groove wall 13R with the main-channel signal $T_R$ and the modulated sub-channel signal $T_Q'$ as shown in FIG. 1.

Further, in another prior art example, the sub-channel signals $T_T$ and $T_Q$ from the pre-emphasis circuits 10 and 11 are applied to a sum and difference circuit 29 shown by dotted lines in FIG. 1 to produce signals $T_T + T_Q$ and $T_T - T_Q$ which are applied to the angular modulators 6 and 7 to angular-modulate the carrier signal. Thus, the angular modulators 6 and 7 produce signals $(T_T + T_Q)'$ and $(T_T - T_Q)'$ which are added with the main-channel signals $T_L$ and $T_R$ at the mixer 5 to produce two multiplex signals $T_L + (T_T + T_Q)'$ and $T_R + (T_T - T_Q)'$. These signals are supplied to the cutter 9 to engrave the sound groove of the recording lacquer disc 12 at its one wall with the signal $T_L + (T_T + T_Q)'$ and at its other wall with the signal $T_R + (T_T - T_Q)'$.

An apparatus for reproducing the sound of the thus recorded disc for the multidirectional stereo reproduction will next be described with reference to a systematic diagram shown in FIG. 2. A record disc 15 produced by the lacquer disc 12 is placed on a turntable 14. A signal picked up from the record disc 15 by a pickup device 16 is applied to a preamplifier 17 to derive therefrom the main-channel signals $T_L$ and $T_R$ which are fed to a decoder 22 through a reproducing equalizer 18 having characteristics reverse to those of the recording equalizer 4. The modulated sub-channel signals $T_T'$ and $T_Q'$ derived from the preamplifier 17 are applied through a band pass filter 19 for separating the main-channel signal components therefrom to an angular demodulator 21 to reproduce the sub-channel signals $T_T$ and $T_Q$. These signals $T_T$ and $T_Q$ are supplied to the decoder 22 together with the main-channel signals $T_L$ and $T_R$. As a result, the decoder 22 produces signals similar to audio signals $S_{LF}$, $S_{RF}$, $S_{LB}$ and $S_{RB}$ which exhibit a sound field recorded on the 4-channel tape. These signals $S_{LF}$, $S_{RF}$, $S_{LB}$ and $S_{RB}$ are supplied through an amplifier 23 to the left- and right-front loud-speakers $L_F$ and $R_F$ and left- and right-back loud-speakers $L_B$ and $R_B$ which are arranged in 2-2 disposition.

Further, in that case that the sum and difference circuit 29 is inserted in the sub-channel as another embodiment shown in FIG. 1, a sum and difference circuit 30 having a characteristic reverse to that of the circuit 29 of FIG. 1 is connected between the decoder 22 and the angular demodulator 21. The signals $(T_T + T_Q)'$ and $(T_T - T_Q)'$ from the band pass filter 19 are applied to the angular demodulator 21 to derive therefrom demodulated signals $T_T + T_Q$ and $T_T - T_Q$ which are applied to the sum and difference circuit 30 to produce the original signals $T_T$ and $T_Q$. These signals $T_T$ and $T_Q$ are applied to the decoder 22.

When considering a noise, caused by the record disc itself during the reproduction of a multi-directional record disc, the signal-to-noise ratio of the main-channel signals $T_L$ and $T_R$ is good, while that of the sub-channel signals $T_T$ and $T_Q$ is not so good. It is considered that the inferior signal-to-noise ratio of the latter is caused by imperfect engraving of a carrier level signal on the lacquer disc 12, or a noise dependent upon the fineness of the particles of the record material or the granularity of a record disc, and the like. Accordingly, when a 4-channel reproduction is carried out by way of example, signal-to-noise ratio during the reproduction is greatly affected by that of the sub-channel signals $T_T$ and $T_Q$. Particularly, a phenomena similar to a drop out is liable to occur at the inner groove of a record disc. This is because, at the inner groove of the record disc, a harmonic distortion (particularly a secondary harmonic distortion component) caused by reproducing a higher frequency signal component of the main-channel signal becomes great. Meanwhile, when the carrier level is decreased on account of reproducing loss or the like and the harmonic distortion of the main-channel signal is relatively increased in modulated band, a phenomena similar to the drop out occurs. For this reason, in the cutting system, when the level of the main-channel signal is increased in higher frequency range, its level is made low or the carrier level is made high to avoid a noise similar to the noise caused by the drop out. However, in order to reduce the level of the high channel signal if the excessive application of a limiter is used, no high channel is produced and hence no signal is reproduced with high fidelity. Further, as set forth above, even if at the inner groove of the record disc, the carrier level is made high, the curvature radius of crest and trough of record becomes small at the inner periphery of record upon reproduction. Thus, the reproducing stylus can not achieve reproduction with high fidelity. Thus, a curvature overload occurs. The high frequency components of modulated signals are lowered, so that the effect of a carrier level control (hereinafter referred to as a CLC) is low.

When reproducing the record disc as described above, the carrier level is limited on account of the curvature overload of a reproducing pickup stylus or the like. In FIG. 3, if the abscissa represents frequency in KHz and the ordinate represents the velocity level of the cutting stylus in $mm/_{sec}$, a modulating level is not increased upon reproduction, for example, under the condition that the carrier level upon cutting is taken above a straight line 24 as described later. Then, it results in an abnormal reproducing condition or the curvature overload is apt to occur. This curvature overload is apt to occur at the inner groove rather than at the outer groove. The quantitative expression thereof will be given in the following manner.

In the case where the carrier frequency is 30 KHz, the radius of a record disc is 60 mm and the revolution is 33 r.p.m., the waveform of the carrier is determined by the following factors, that is, the wave length λ which is expressed as follows:

$$\lambda = \frac{2\pi RN}{60f} \quad (2)$$

where $f$ is the frequency, R is the radius of a record disc, and N is the number of rotation of the record disc; the displacement amplitude $a$ which is given as follows:

$$a = \frac{V}{2\pi f} \quad (3)$$

where V is the velocity amplitude of the signal; and $r$ is the curvature radius of modulated signal expressed as follows:

$$r = \frac{1}{a}\left(\frac{\lambda}{2\pi}\right)^2 \quad (4)$$

Thus, the following values are obtained.

$\lambda = 7.0\ \mu,\ a = 0.185\ \mu,\ r = 6.8\ \mu$

When the stylus is considered, the curvature radius of the stylus chip is generally at most 7 μ due to the limitation of its manufacture and reducing the abrasion of record, and becomes substantially coincident with the curvature radius $r$ of modulated signal of the expression (4). Thus, the range of velocity amplitude which avoids the curvature overload is about 35.4 mm/sec.

Meanwhile, when the velocity limiting line 24 at which the curvature overload appears is obtained, if a groove speed is taken as S, the following relation is obtained.

$$f\lambda = S \quad (5)$$

By substituting the equation (5) for the equation (4), the following equation isobtained.

$$r = \frac{1}{a}\left(\frac{\frac{S}{f}}{2\pi}\right)^2 \quad (6)$$

This is rewritten as follows:

$$a = \frac{1}{r}\frac{S^2}{(2\pi f)^2} \quad (7)$$

If both members of the above equation (7) are multiplied by ω, the following equation is obtained.

$$\omega a = \frac{1}{r}\frac{S^2}{(2\pi f)^2}\omega \quad (8)$$

The above is rewritten as follows:

$$\omega a = \frac{1}{r}\frac{S^2}{(2\pi f)^2} \times 2\pi f = \frac{S^2}{2\pi fr} \quad (9)$$

In this case, the groove speed S is given as follows:

$$S = \frac{\pi D}{T} \quad (10)$$

where D is the diameter of the record disc and T is the period. If the equation (10) is substituted for the equation (9), the following equation is given.

$$\omega a = \frac{\pi^2 D^2}{2\pi frT^2} \quad (11)$$

The above is rewritten as follows:

$$V = \frac{\pi D^2}{2frT^2} \quad (12)$$

Thus, the straight line 24 shown in FIG. 3 is obtained.

The cutting velocity of a main-channel signal is expressed normally with RIAA characteristics as in FIG. 4. The cutting velocity $v_M$ of a signal level of 1 KHz is 22.3 mm/sec. In this case, second and third harmonic distortions $D_2$ and $D_3$ are calculated as follows:

$$D_2 = \frac{\pi f r v_M^2}{S^2} \quad (13)$$

$$D_3 = \frac{3}{2} \frac{\pi^2 f^2 r^2 v_M^2}{S^4} \quad (14)$$

It will be apparent from the above that as the groove speed S becomes small, the tracing distortion increases abruptly. This results from the fact that if a velocity for cutting the groove is decreased, a recording wavelength becomes short to make the waveform of the sound groove sharp and hence a contact point of the sound groove wall with the reproducing stylus is greatly shifted from the bottom end of the reproducing stylus. If this harmonic distortion appears in the modulated band to disturb a modulated signal, the drop out phenomenon occurs. In this case, however, if the amount of a harmonic component to cause the disturbance is small as compared with the level of the modulated signal, the drop out may not occur.

In the above described example, when the cutting velocity $v_M$ of the signal level of 1 KHz is 22.3 mm/sec, the second and third harmonic distortions are shown by straight lines 25 and 26 in FIG. 3. Of course, in this case, the harmonic components of the main-channel signal are contained in the modulated band to produce the distortion components which are shown by the straight lines 25 and 26 in frequency and velocity level. The straight line 25 shows a characteristic of substantially 3rd power of frequency and the straight line 26 substantially 5th power of frequency. A dotted straight line 27 shows the velocity level of a prior art constant speed recording.

In FIG. 3, if a main-channel signal of, for example, 10 KHz is taken into consideration, the frequency of the second harmonic distortion becomes 20 KHz. Therefore, the second harmonic distortion caused by the component of the main-channel signal having a frequency more than 10 KHz is contained in the modulated band and similarly the third harmonic distortion caused by the component of the main-channel signal having a frequency more than 6.7 KHz is contained in the modulated band. As apparent from the figure, the second harmonic distortion is greater than the third harmonic distortion so that the third harmonic distortion may be almost neglected. When a number of music signals are recorded on the record, there is nearly no component of the main-channel signal more than 15 KHz, so that it can be considered that the harmonic distortion is distributed mostly in a range less than 30 KHz.

It will be noticed from the foregoing that the modulated signal of 30 KHz or less is easily disturbed by the harmonic distortion of the main-channel signal. It may be considered that when the high frequency component of the main channel signal is mixed into the carrier, by raising the carrier level the S/N ration of the mixed signals is improved. However, such a method is apt to be affected by the curvature overload.

SUMMARY OF THE INVENTION

Accordingly, an object of this invention is to lower the noise caused by recording and reproducing multidirectional sound signals on and from a record disc.

The present invention is characterized by recording a modulated signal at a constant acceleration in order to eliminate the aforesaid defects.

A filter is provided in the modulated signal path so as to carry out recording of modulated signals at constant-acceleration within the range of the velocity level limiting line where the overload occurs, and second and third high harmonic signal components of the main channel signal.

A first object of the invention is to reduce interferences with the high harmonic components in the high band of the main channel signal by constant-acceleration recording of the modulated signals.

A second object of the invention is to provide a circuit in which an ordinary filter, which is increased at 6 dB/oct for isolating in the main-channel and sub-channel signals upon reproduction can be employed.

A further object of the invention is to reduce a curvature overload upon reproduction.

The other objects, features and advantages of the invention will become apparent from the following description taken in conjunction with the accompanying drawings.

DESCRIPTION OF THE PREFERRED EMBODIMENT

Figure 1:
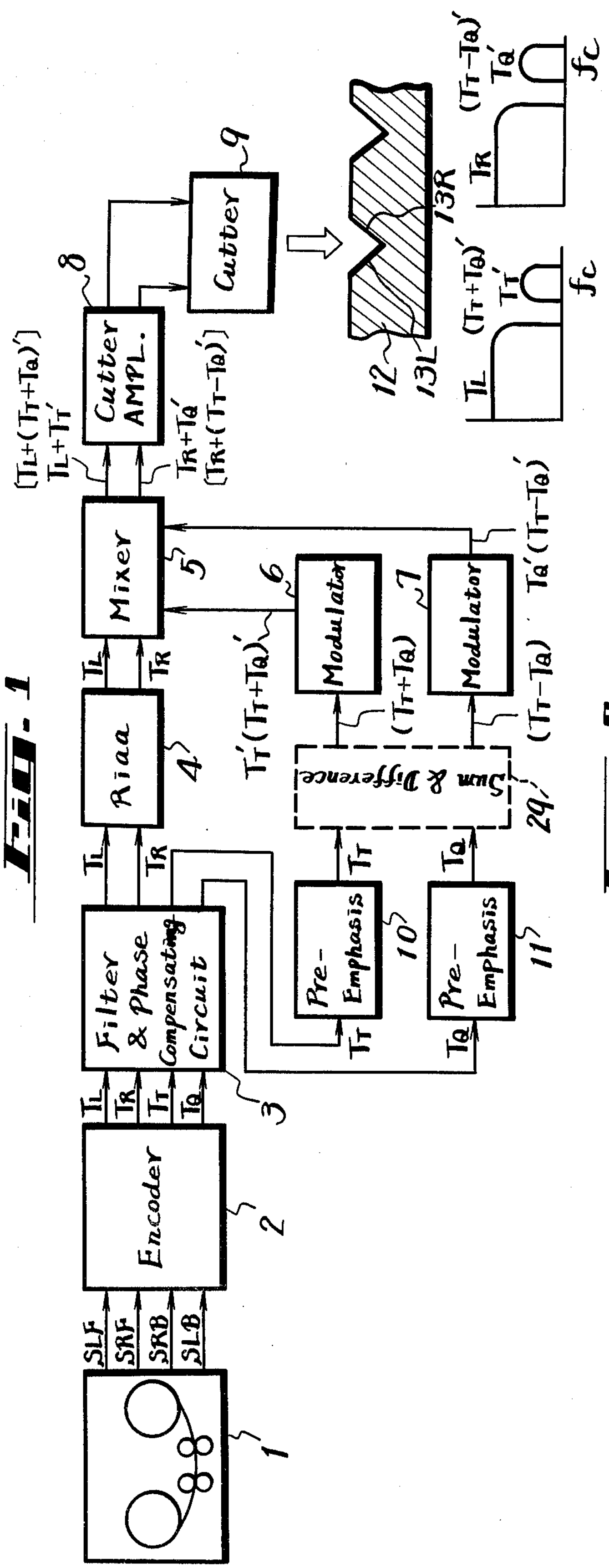
FIG. 1 is a block diagram showing a recording apparatus of a multiple record applied with a prior art UM system.
Figure 2:
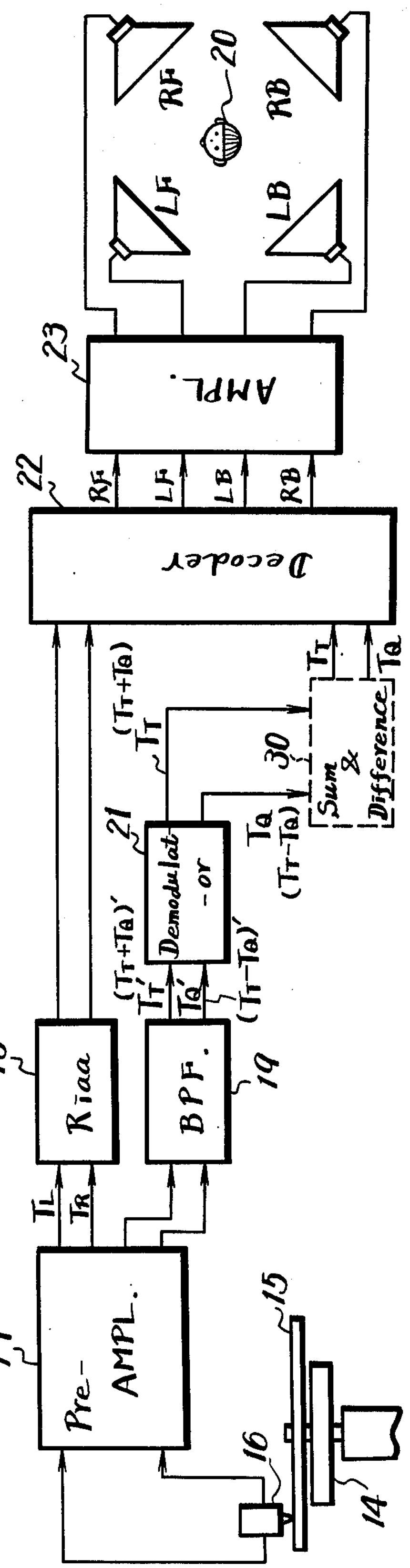
FIG. 2 is a block diagram showing a reproducing apparatus of the similar multiple record according to the UM system.
Figure 3:
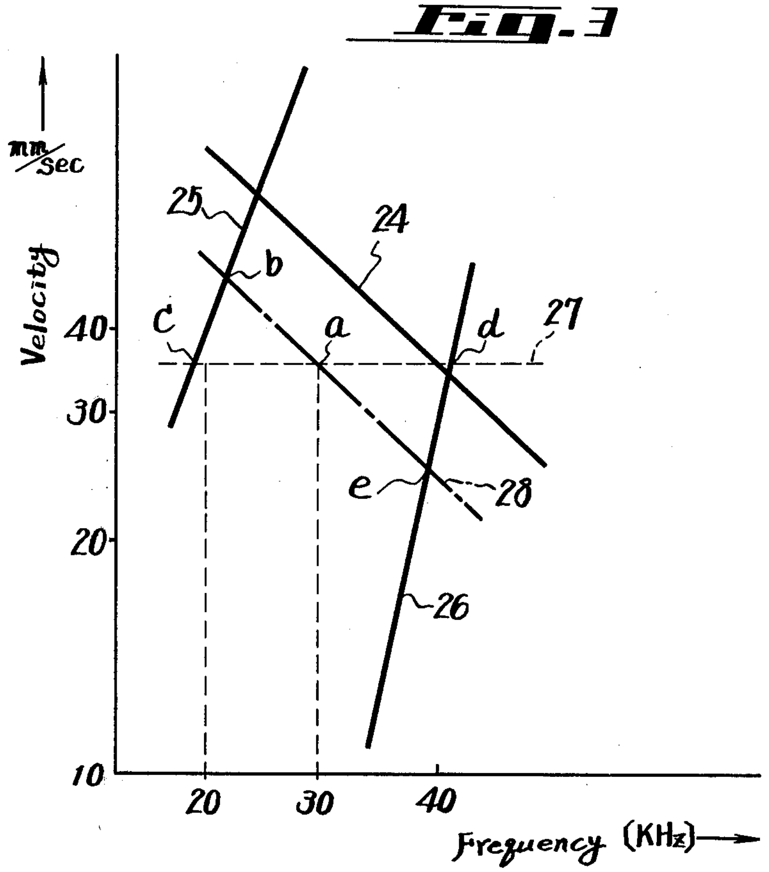
FIG. 3 is a graph showing frequency-velocity level characteristics of second and third harmonic distortion components according to a main-channel signal and a characteristic of curvature overload.
Figure 4:
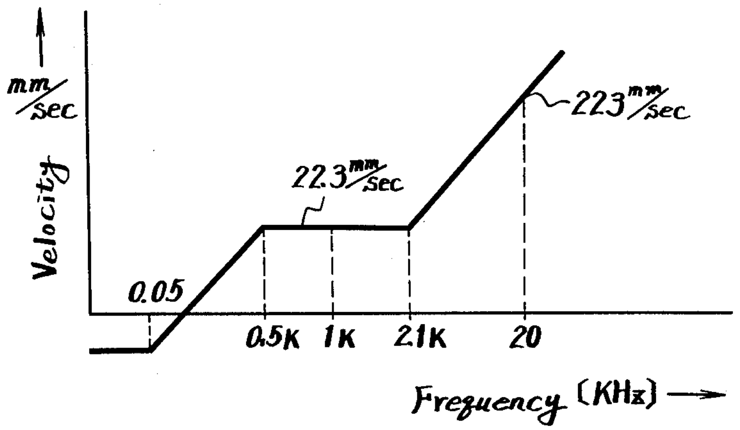
FIG. 4 is a graph showing an RIAA characteristic of a main-channel signal at its cutting time.
Figure 5:
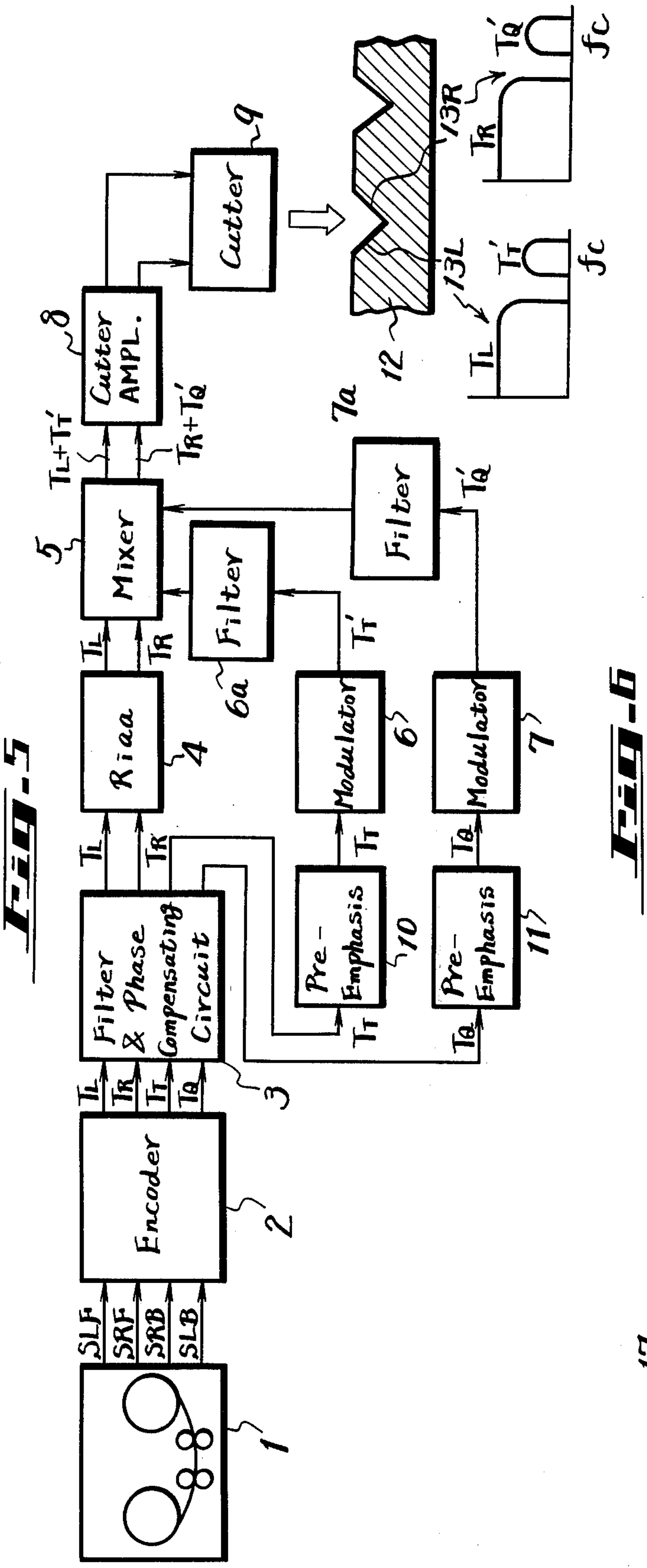
FIG. 5 is a block diagram showing a multi-directional stereo multiple recording apparatus according to this invention.
Figure 6:
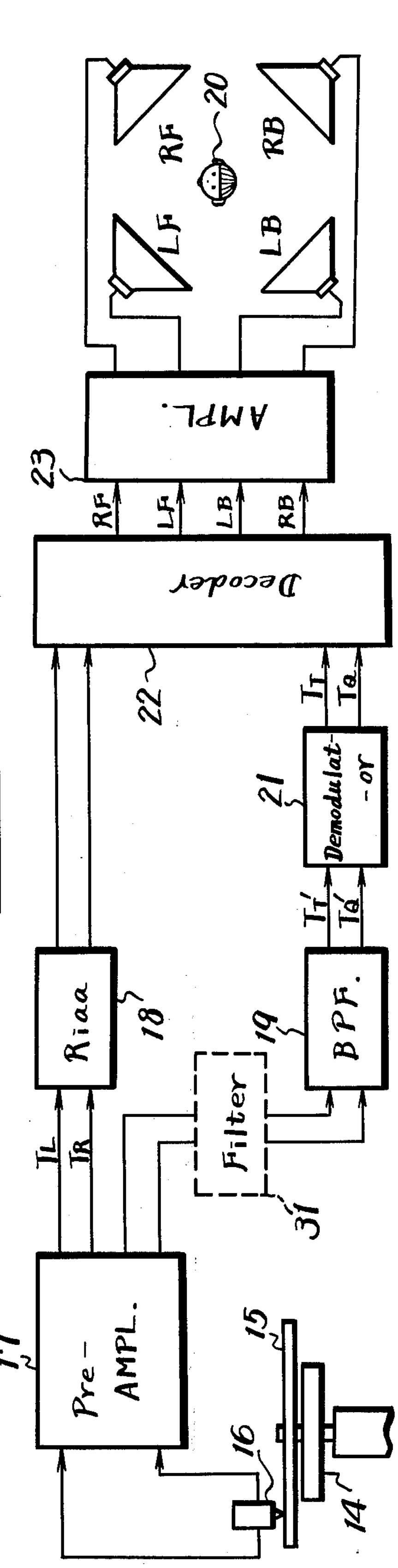
FIG. 6 is a systematic view showing a reproducing apparatus for reproducing a record disc recorded by the recording apparatus of FIG. 1.
Figure 7:
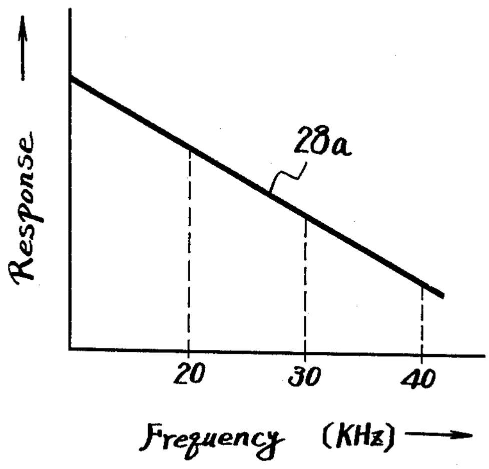
FIG. 7 is a graph showing a frequency characteristic of a filter for a modulated signal of a recording apparatus of this invention.

A description will hereinafter be given on one embodiment of this invention with reference to FIGS. 5 and 6 in which elements corresponding to those in FIGS. 1 and 2 are shown by the same reference numerals with their repeated description being omitted. In the recording apparatus of FIG. 5, filters 6*a* and 7*a* are connected between the angle modulators 6 and 7 and the mixer 5. The added filters 6*a* and 7*a* have a frequency characteristic providing an output signal corresponding to velocity increase such as to further modulate the modulated sub-channel signals $T_T'$ and $T_Q'$ causing them to be recorded at a constant acceleration. In constant acceleration recording, the time differentiation ($dv/dt$) of the velocity of the cutting stylus becomes constant, regardless of input signal frequency, by using the filter of 6dB/oct. when the frequency spectrum is constant in amplitude. Thus if the frequency becomes twice, the acceleration of the stylus motion becomes twice. Meanwhile, in the reproducing apparatus of FIG. 6, the characteristic of the filter 19 may not be made flat, or a filter having a characteristic such as to increase with frequency at a rate of 6 $dB/_{oct}$ may be connected at the front stage of the filter 19. At the above described recording apparatus or cutting side, modulated sub-channel signals are applied to filters each having a characteristic of FIG. 7 in which the response drops at a rate of 6 $dB/_{oct}$ in a frequency band of the angle modulated signal. In this case, a straight line 28*a* of 6 $dB/_{oct}$ is selected as shown in FIG. 3 by a straight line 28. That is, the one-dot straight line 28 representing the carrier level of the modulated sub-channel signals is bonded by the curvature overload limitation line 24 and the second and third high harmonic distortion lines 25, 26 respectively, and intersected by the constant velocity amplitude line 27 produced by the prior art at the point a (30KHz) and is preferably parallel with the line 24. The lines 25 and 26 are the second and third high harmonic distortions of the drop outs caused by the high harmonic distortions being mixed into the modulated signal band.

If the characteristics of the filters are selected as described above, the carrier level of the modulated sub-channel signal can be made greater than the harmonic component level of the main-chanel signal by the amount corresponding to a triangle abc of FIG. 3 in a frequency band below 30 KHz. Therefore, the drop out becomes difficult to occur and hence the cutting level of the main-channel signal can also be enhanced. Further, the area of a triangle ade deteriorates as compared with the constant speed amplitude recording line 27. However, if the straight lines 27 and 28 are selected to intersected each other at a position *a*, which corresponds to 30 KHz, as shown in FIG. 3, the effect of harmonic distortion of the main-channel signal can be substantially neglected in a frequency band over 30 KHz, because the reproducible upper limit of the main-channel signal is 15 KHz.

Thus, if the filters are selected as described above, in the line 28 as seen in FIG. 3 can be moved gradually closer to the line 24 in an ordinary discrete multi-stereo reproduction system since the carrier signal is 30 KHz. Thus, the curvature overload has substantially no effect. Further, the lines 25 and 26 of the second and third harmonic distortions of the high harmonic signals of the main channel signal depend upon the main channel, so that the velocity level is varied in accordance with the RIAA characteristics. As may be apparent from FIG. 3, the second distortion component is greater than the third distortion component. Looking at the line 27 corresponding to the prior art the case of constant velocity recording; when the carrier frequency is 30 KHz, the velocity level at the point *a* is, for example, 35.4 mm/sec., but 40 mm/sec. at the point *c* of the second high harmonic line 25 and corresponds for example, to 10 KHz. If the third high harmonic of either a 10 KHz main channel signal or that of 30 KHz carrier signal is considered, a decrease to a minus level on the line 26 occurs so that there is no problem at all. If the main channel signal is at 15 KHz, which is the upper limit of the main channel, the jamming frequency is 45 KHz. Thus, the level of the third harmonic rises on the portion of the line 26 extending above the constant amplitude velocity line 27. In this case, while this level is above the modulated carrier level line 28 the spectrum level near 15 KHz is very low. Thus, it can be neglected when recording musical signals.

Figure 9:
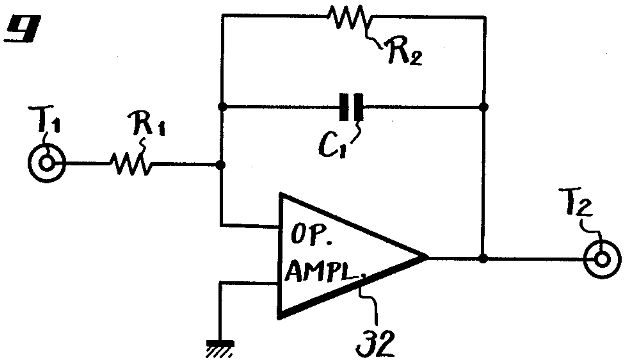
FIG. 9 is a schematic view showing a filter used in a recording apparatus of this invention.

FIG. 9 shows an example of a practical circuit used in each of the filters 6*a* and 7*a*. In FIG. 9, a terminal $T_1$ is connected to the angular modulator 6 or 7 and a terminal $T_2$ is connected to the mixer 5. Reference numeral 32 identifies an operational amplifier which is of a type, for example, BB-3500A made by Burr Brown Co. The values of resistors $R_1$ and $R_2$ and a capacitor $C_1$ are selected as follows:

$R_1 = R_2 = 1\ K\Omega$
$C = 0.047\ \mu F$

Figure 10:
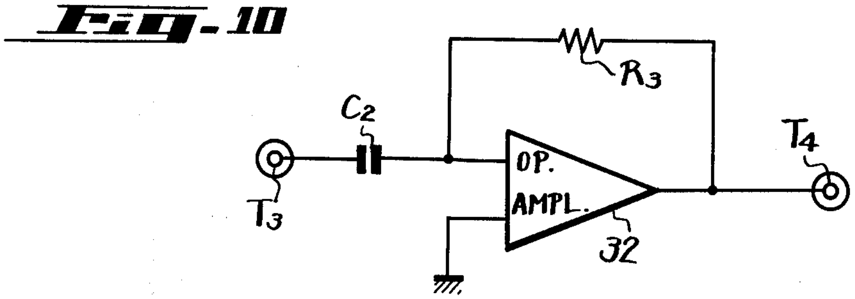
FIG. 10 is a schematic view showing a filter used in a reproducing apparatus of this invention.
Figure 8:
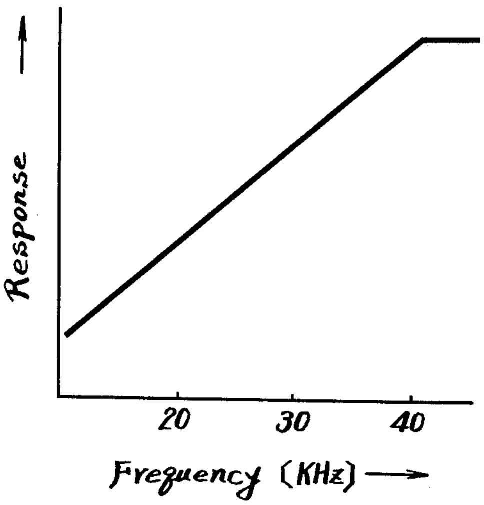
FIG. 8 is a graph showing a favorable frequency characteristic of a filter for separating a modulated signal used in a reproducing apparatus of this invention.

In addition, as a filter to pass therethrough modulated sub-channel signals, the characteristic of the filter 19 of FIG. 2 at the reproducing apparatus is not made flat but increased with frequency at a rate of 6 $dB/_{oct}$ as shown in FIG. 8. Thus, the filter can serve to separate the modulated signal required for the reproducing demodulator from the main-channel signal and its design is also easy. Further, when a filter 31 is provided in addition to the filter 19, an example of its practical circuit is shown in FIG. 10 in which the values of elements are selected as follows:

$C_2 = 0.3\ \mu F$
$R_3 = 10\ k\Omega$

An operational amplifier 32 in this circuit is the same as that of FIG. 9.

According to the invention, the curvature overload becomes difficult to occur at the inner groove of the record disc, the carrier level at 30 KHz can be enhanced so that the drop out becomes difficult to be produced, and the possibility of the curvature overload is decreased even though the CLC is carried out.

It will be apparent that many modifications and variations may be effected without departing from the scope of the novel concepts of this invention.

I claim as my invention:

1. A multi-directional stereo multiple recording apparatus comprising:

a. encoder means for encoding a plurality if input signals corresponding to a plurality of sound sources in a plurality of main-channel signals and sub-channel signals;
b. mixer means for producing a multiplex signal;
c. means for applying said main-channel signals from said encoder means to said mixer means;
d. angle-modulator means for angle-modulating a carrier signal of a given frequency by said sub-channel signals to produce modulated sub-channel signals;
e. filter means for further modulating at a constant acceleration said modulated sub-channel signals interposed between said angle-modulator means and for applying said modulated sub-channel signals to said mixer means; and
f. cutter means for recording the output of said mixer means on a groove of a lacquer disc.

2. A multi-directional stereo multiple recording apparatus as set forth in claim 1, wherein said filter means has a filtering characteristic such as to drop at a rate of 6 $dB/_{oct}$.

3. A multi-directional stereo multiple recording apparatus as set forth in claim 1, wherein said filter means is selected to have a characteristic defined by a straight line plotted with frequency as the abscissa and velocity as ordinate bounded by a curvature overload limiting line and straight lines defining second and third harmonic distortions of drop out caused by a harmonic distortion of the main-channel signal contained in a frequency range of the modulated sub-channel signal, said filtering characteristic being parallel with said curvature overload limiting line and intersecting a constant speed amplitude straight line.

4. A multi-directional stereo multiple recording apparatus as set forth in claim 1, wherein said filter means is composed of an operational amplifier having one input end thereof grounded and an other input end thereof applied with a modulated sub-channel signal through a first resistor, and a parallel connection of a second resistor and a capacitor provided between said other input end of the operational amplifier and an output terminal.

5. A method for recording sound on a lacquer disc by engraving said disc in a constantly accelerating cut, comprising the steps of encoding a plurality of input signals corresponding to a plurality of sound sources in a plurality of main channel signals and sub-channel signals, causing said sub-channel signals to angle modulate a carrier signal of predetermined frequency to produce modulated sub-channel signals, filtering said modulated sub-channel signals to further modulate said sub-channel signals to a constant acceleration responsive to the engraving of said disc, applying said main-channel signal and said accelerated sub-channel signals to a mixer and thereafter applying said mixed signal to an engraving stylus for engraving said disc.

6. A record disc engraved with multiple recorded signals according to the process of claim 5.

7. In apparatus for reproducing sound from a disc recorded in accordance with claim 5 having a band pass filter for separating a modulated sub-channel signal from a main channel signal and including a reproducing filter having a frequency characteristic response to velocity of said recording such as to rise at a rate of 6 dB/oct.

8. The apparatus according to claim 7, wherein said reproducing filter is in series with said band pass filter.

9. The apparatus according to claim 7, wherein said reproducing filter is a part of said band pass filter.

10. The apparatus according to claim 7, wherein said reproducing filter comprises an operational amplifier having one input end thereof grounded and another input end thereof applied with a modulated sub-channel signal through a capacitor, and a resistor connected between said other input end of the operational amplifier and an output terminal.

* * * * *